United States Patent [19]

Klocek

[11] Patent Number: 5,808,799
[45] Date of Patent: Sep. 15, 1998

[54] INFRARED LENS ASSEMBLY WITH ATHERMALIZATION ELEMENT AND METHOD

[75] Inventor: Paul Klocek, Dallas, Tex.

[73] Assignee: Raytheon TI Systems, Inc., Lewisville, Tex.

[21] Appl. No.: 951,763

[22] Filed: Oct. 16, 1997

Related U.S. Application Data

[60] Provisional application No. 60/030,099 Oct. 31, 1996.

[51] Int. Cl.⁶ .............................. G02B 27/10; H01S 3/00; H01L 25/00; G01J 5/02
[52] U.S. Cl. .......................... 359/619; 359/335; 250/332; 250/339.02
[58] Field of Search .................................. 359/619, 350, 359/355, 356, 357, 361; 250/332, 339.04, 339.02, 339.11, 316.1, 339.14, 339.15, 341.8, 342

[56] References Cited

U.S. PATENT DOCUMENTS

| | | | |
|---|---|---|---|
| 5,044,706 | 9/1991 | Chen | 359/357 |
| 5,100,218 | 3/1992 | Tuck et al. | 359/234 |
| 5,202,792 | 4/1993 | Rollin | 359/356 |
| 5,260,828 | 11/1993 | Londono et al. | 359/565 |
| 5,299,062 | 3/1994 | Ogata | 359/571 |
| 5,493,441 | 2/1996 | Chipper | 359/354 |
| 5,504,628 | 4/1996 | Borchard | 359/796 |
| 5,532,048 | 7/1996 | Klocek et al. | 428/215 |
| 5,567,291 | 10/1996 | Fujikawa et al. | 250/353 |
| 5,703,363 | 12/1997 | Hayes | 250/332 |

OTHER PUBLICATIONS

"A Hybrid Approach Opens Doors for Diffractive Optics," by Greg Behrmann and John Bowen, Phototronics Spectra, May 1993.

"Influence of temperature on diffractive lens performance," by Gregory P. Behmann and John P. Bowen, Applied Optics, May 1993, vol. 32, No. 14.

*Primary Examiner*—Georgia Y. Epps
*Assistant Examiner*—Ricky Mack
*Attorney, Agent, or Firm*—Baker & Botts, L.L.P.

[57] ABSTRACT

An infrared lens assembly may comprise a lens set (32) including one or more refractive lenses. The refractive lens may be positioned along an optic axis (30) to receive infrared radiation. The lens set (32) may be designed to focus infrared radiation of a scene (14) at an image plane (15). An athermalization element (34) may be positioned along the optic axis (30) in optical communication with the lens set (32). The athermalization element (34) may include an infrared transmitting member (40) supporting a diffractive pattern (42). The infrared transmitting member (40) may comprise an infrared transmitting polymer. The diffractive pattern (42) may compensate for temperature induced changes in a focal length of the lens set (32) to maintain infrared radiation of the scene (14) in focus at the image plane (15).

20 Claims, 2 Drawing Sheets

INFRARED LENS ASSEMBLY WITH ATHERMALIZATION ELEMENT AND METHOD

CROSS REFERENCE TO RELATED APPLICATIONS

This application claims priority under 35 USC § 119 of provisional application No. 60/030,099, filed Oct. 31, 1996.

TECHNICAL FIELD OF THE INVENTION

This invention relates generally to infrared systems, and more particularly to an infrared lens assembly with an athermalization element and method.

BACKGROUND OF THE INVENTION

Infrared or thermal imaging systems are often used to detect fires, overheating machinery, planes, vehicles and people. Thermal imaging systems may also be employed to control temperature sensitive industrial processes. In a thermal imaging system, infrared or thermal radiation may be detected by a plurality of thermal sensors. The thermal sensors typically detect thermal radiance differences between various objects in a scene and display these differences as a visual image of the scene.

The basic components of a thermal imaging system generally include optics for collecting and focusing infrared radiation from a scene, an infrared detector having a plurality of thermal sensors for converting infrared radiation to an electrical signal, and electronics for amplifying and processing the electrical signal into a visual display or for storage in an appropriate medium. A chopper is often included in a thermal imaging system to modulate the infrared radiation and to produce a constant background radiance which provides a reference signal. The electronic processing portion of the thermal imagining system will subtract the reference signal from the total radiance signal to produce a signal with minimum background bias.

Thermal imaging systems may use a variety of infrared detectors. An infrared detector is a device that responds to electromagnetic radiation in the infrared spectrum. Infrared detectors are sometimes classified into two main categories as cooled and uncooled. A cooled infrared detector is an infrared detector that must be operated at cryogenic temperatures, such at the temperature of liquid nitrogen, to obtain the desired sensitivity to variations in infrared radiation. Cooled detectors typically employ thermal sensors having small bandgap semiconductors that generate a change in voltage due to photoelectron interaction. This latter effect is sometimes called the internal photoelectric effect.

Uncooled infrared detectors cannot make use of small bandgap semiconductors because dark current swamps any signal at room temperature. Consequently, uncooled detectors rely on other physical phenomenon and are less sensitive than cooled detectors. However, because uncooled detectors do not require the energy consumption of cooled detectors, they are the preferred choice for portable, low power, applications where the greater sensitivity of cooled detectors is not needed. In a typical uncooled thermal detector, infrared photons are absorbed and the resulting temperature difference of the absorbing element is detected. Thermal detectors include pyroelectric detector, a thermocouple, or a bolometer.

Infrared radiation is generally focused onto a thermal detector by an infrared lens system. A problem with infrared lenses is that the focal length of the lenses may vary with changes in temperature. Consequently, the image of the scene may be focused forward or rearward of the thermal detector to create a blurred image.

SUMMARY OF THE INVENTION

Accordingly, a need has arisen in the art for an improved infrared lens assembly. The present invention provides an athermalization element that substantially eliminates or reduces the disadvantages and problems associated with prior infrared lens assemblies.

In accordance with the present invention, an infrared lens assembly may comprise a lens set including one or more refractive lenses. The refractive lens may be positioned along an optic axis to receive infrared radiation. The lens set may be designed to focus infrared radiation of a scene at an image plane. An athermalization element may be positioned along the optic axis in optical communication with the lens set. The athermalization element may include an infrared transmitting member supporting a diffractive pattern. The infrared transmitting member may comprise an infrared transmitting polymer. The diffractive pattern may compensate for temperature induced changes in a focal length of the lens set to maintain infrared radiation of the scene in focus at the image plane.

In one embodiment, for example, increasing temperatures may shorten the focal length of the lens set. In response to the temperature increase, the polymer of the infrared transmitting member may expand to alter the diffractive pattern. The altered diffractive pattern may lengthen a focal length of the athermalization element to offset the shortening of the focal length of the lens set. Conversely, temperature decreases may lengthen the focal length of the lens set. In response to the temperature decrease, the polymer of the infrared transmitting member may contract to alter the diffractive pattern. The altered diffractive pattern may shorten the focal length of the athermalization element to offset the lengthening of the focal length of the lens set.

In one embodiment, a color correction element may be positioned along the optic axis. The color correction element may be in optical communication with the lens set and the athermalization element. The color correction element may comprise a diffractive surface to correct color aberrations of the lens set and the athermalization element. In a particular embodiment, the diffractive surface of the color correction element may be formed on the infrared transmitting member opposite the diffractive pattern of the athermalization element.

Important technical advantages of the present invention include providing an improved infrared lens assembly. In particular, a passive athermalization element may compensate for temperature induced changes in the focal length of a lens to maintain infrared radiation of a scene in focus with a thermal detector. Accordingly, the image generated by the thermal detector will not become blurred due to temperature variations.

Still another important technical advantage of the present invention includes providing a relatively low cost athermalization element for an infrared lens assembly. The athermalization element may be a polymer lens having a diffractive pattern. Additionally, the athermalization element may be stationary within the lens assembly. Accordingly, the athermalization element may be inexpensively fabricated and mounted within the lens assembly.

Other technical advantages will be readily apparent to one skilled in the art from the following figures, descriptions, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
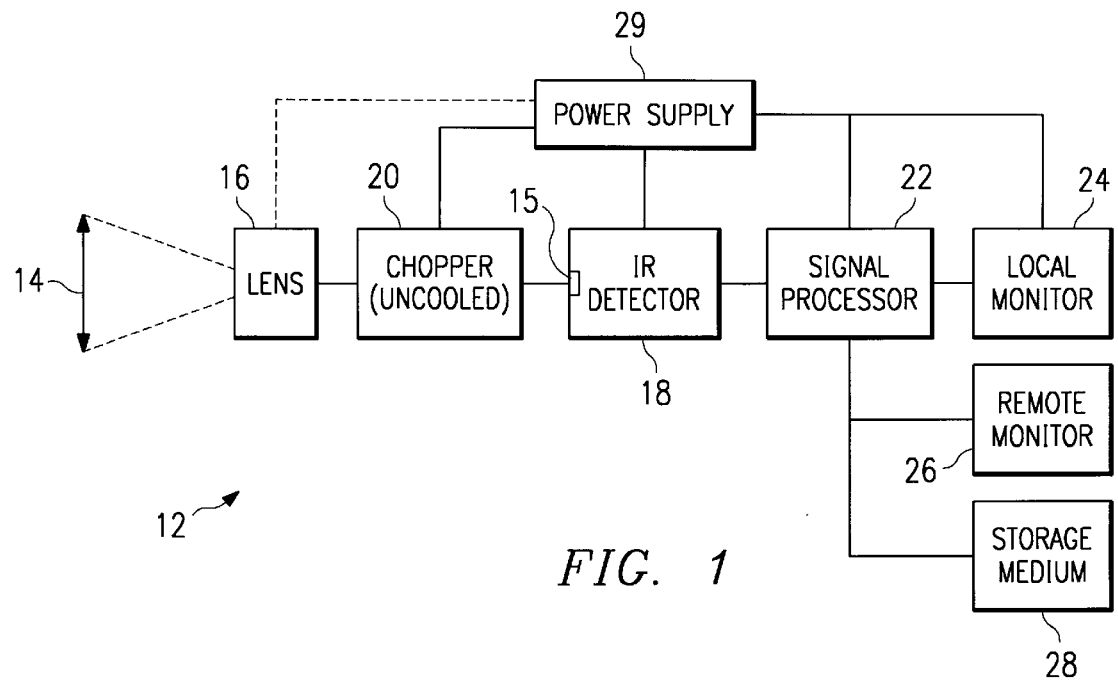
FIG. 1 is a block diagram of an infrared imaging system with a lens assembly having an athermalization element in accordance with the present invention.

The preferred embodiments of the present invention and its advantages are best understood by referring now to FIGS. 1 through 4 of the drawings, in which like numerals refer to like parts throughout the several views. FIG. 1 shows a schematic block diagram of an infrared imaging system 12 for detecting, processing, and displaying the heat image of an object 14. The infrared imaging system 12 may be used to detect fires, overheating machinery, planes, vehicles and people, and to control temperature sensitive industrial processes.

As shown by FIG. 1, the infrared imaging system 12 may comprise a lens assembly 16 in optical communication with an infrared detector 18. The infrared detector 18 may sense infrared radiation, typically, in the spectral bands from 3 to 5 microns (having an energy of 0.4 to 0.25 eV) or from 8 to 14 microns (having an energy of 0.16 to 0.09 eV) The 3–5 micron spectral band is generally termed the "near infrared band" while the 8 to 14 micron spectral band is termed the "far infrared band." Infrared radiation between the near and far infrared bands cannot normally be detected due to atmospheric absorption.

The lens assembly 16 may focus or direct infrared radiation emitted by the object 14 onto an image plane 15 of the infrared detector 18. In cases where an uncooled detector 18 is used, a chopper 20 is often disposed between the lens assembly 16 and the infrared detector 18. The chopper 20 may be controlled by a signal processor 22 to periodically interrupt transmission of the infrared image to the image plane 15 of the infrared detector 18. The chopper 20 may be a rotating disk with openings that periodically block and let pass infrared radiation.

The infrared detector 18 may translate incoming infrared radiation into one or more images and corresponding electrical signals for processing. Electrical signals may be fed to the signal processor 22, which assembles electrical signals into video signals for display. As previously described, the signal processor 22 may also synchronize operation of the chopper 20. This synchronization enables the signal processor 22 to subtractively process incoming infrared radiation to eliminate both fixed infrared background radiation and time constant noise. The output of the signal processor 22 is often a video signal that may be viewed, further process, stored, or the like.

The video signal may be viewed on a local monitor 24 or fed to a remote monitor 26 for display. The local monitor 24 may be an eye piece containing an electronic viewfinder, a cathode ray tube, or the like. Similarly, the remote monitor 26 may comprise an electronic display, a cathode ray tube, such as a television, or other type of device capable of displaying the video signal. The video signal may also be saved to a storage medium 28 for later recall. The storage medium 28 may be a compact disk, a hard disk drive, random access memory, or any other type of medium capable of storing electronic video signals for later recall. Monitors and storage mediums are well known in the art and therefore will not be further described herein.

Electrical power to operate the infrared imager system 12 may be provided by a power supply 29. The power supply 29 may provide electrical power directly to the chopper 20, the infrared detector 18, the signal processor 22, and to the local monitor 24. Electrical power may also be provided to the lens 16, when, for example, a motor is employed to focus the lens 16.

Figure 2:
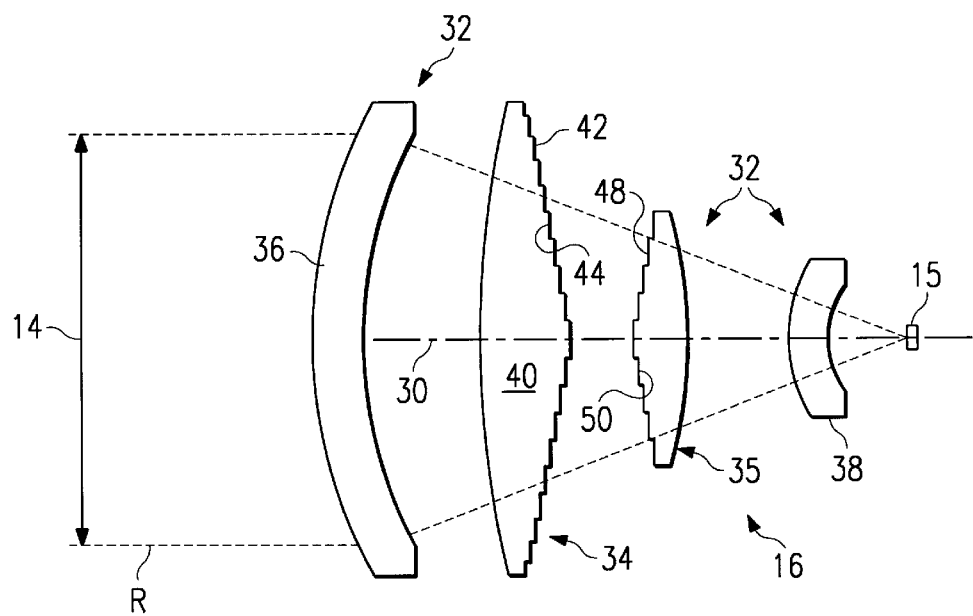
FIG. 2 is a schematic drawing illustrating one embodiment of the lens assembly of FIG. 1.

FIG. 2 is schematic drawing illustrating one embodiment of the lens assembly 16. As shown by FIG. 2, the lens assembly 16 may be positioned along an optic axis 30 to focus infrared radiation emitted by the object 14 onto the image plane 15 of the infrared detector 18. The lens assembly 16 may comprise a lens set 32 and an athermalization element 34. The lens set 32 may include one or more refractive lenses and a color correction element 35. The refractive lenses may include an objective lens 36 and a collection lens 38.

In accordance with conventional practice, the radius of curvature of the lenses will be defined as positive if the center of curvature lies to the right of the lens and will be defined as negative if the center of curvature lies to the left of the lens along optic axis 30. A lens will be defined as converging if the lens focussing power causes parallel light rays to converge, and will be defined as diverging if the lens focussing power causes parallel light rays to appear to originate from a virtual focus. Further, a side of a lens will be defined as a first side if facing the object 14 and defined as a second side if facing the image plane 15.

For the embodiment of FIG. 2, the objective lens 36 and the collection lens 38 may both be positive converging lenses. In this embodiment, the lens assembly 16 may be generally described as a single field of view lens. It will be understood that the lens assembly 16 may be of another type capable of focusing infrared radiation emitted 25 by the object 14 onto the image plane 15 of the infrared detector 18. For example, the lens assembly 16 may be a focusing zoom lens. It will be further understood that the lens assembly 16 may include additional, disparate, negative and/or diverging lenses within the scope of the present invention.

The objective lens 36 and the collection lens 38 may be formed of an infrared transmitting glass, such as Germanium, Gallium Arsenide (GaAs) or Chalcogenide glass. The Chalcogenide glass may be TI-1173, manufactured by Texas Instruments Incorporated. It will be understood that the objective and the collection lenses 36 and 38 may be formed of other types of glass or other materials capable of transmitting infrared radiation. For example, the lenses 36 and 38 may be formed of an infrared transmitting polymer. The preferred lens material may be a material most compatible with the configuration and make-up of the athermalization element 34 and of the color correction element 35.

A significant feature of the present invention is the construction of the athermalization element 34. The athermalization element 34 may passively athermalize the lens assembly 16 by compensating for temperature induced changes in a focal length of the lens set 32. Accordingly, the athermalization element 34 maintains infrared radiation of the scene 14 in focus at the image plane 15 of the thermal detector 18.

The athermalization element 34 may comprise an infrared transmitting member 40 supporting a diffractive pattern 42. The infrared transmitting member 40 may be an infrared transmitting polymer. The infrared transmitting polymer may be polyethylene, polypropylene, or the like. Other infrared transmitting polymers are disclosed in U.S. Pat. No. 5,532,048 and U.S. Pat. No. 5,325,586. It will be understood that other types of infrared transmitting polymers may be used to form the infrared transmitting member 40 within the scope of the present invention.

For a given lens design and material and a given infrared transmitting polymer, the athermalization element 34 may be designed as follows for a desired temperature range. An optimum thermal expansion coefficient of the lens set 32 may first be determined. The optimum thermal expansion coefficient of the lens set 32, $X_r$, may be calculated by the following equation:

$$x_r = \alpha_r - \frac{1}{n_r - n_o} \left( \frac{dn_r}{dT} - n_r \frac{dn_o}{dT} \right)$$

where: $\alpha_r$ = thermal expansion of coefficient of lens set material $n_r$ = index of refraction of lens set material $\frac{dn_r}{dT}$ = change in index of refraction of lens set versus temperature $n_o$ = index of medium surrounding lens set i.e., air $\frac{dn_o}{dT}$ = change in index of medium surrounding lens set versus temperature For example, using TI 1173 glass at a 10 micron wavelength, the optimum thermal expansion coefficient of the lens set 32 may be as follows:

$$X_r = 15 \times 10^{-6} - \frac{1}{2.6 - 1.0} (91 \times 10^{-6} - 2.6(8.6 \times 10^{-7}))$$

$$X_r = -4.05 \times 10^{-5}$$

From the optimum thermal expansion coefficient of the lens set 32, a focus shift of the lens set 32 may next be calculated for the desired temperature range. The focus shift of the lens set 32, $\Delta f_r$, may be calculated by the following equation:

$$\Delta f_r = f_r \cdot x_r \cdot \Delta T$$

where: $f_r$ = focal length of lens set $X_r$ = optimum thermal expansion coefficient of lens set $\Delta T$ = desired temperature range The temperature range may be 40° C., between 25° C. and 65° C. It will be understood that the athermalization element may be designed for other temperature ranges within the scope of the present invention. Continuing the previous example, for a temperature range of 40° C. and a focal length of four (4) inches, the focus shift of the TI 1173 glass lens set 32 may be as follows:

$$\Delta f_r = 4(-4.34 \times 10^{-5}) 40$$

$$\Delta f_r = -6.94 \times 10^{-3} \text{ inch}$$

Thus, the focal length of the lens set 32 may shift toward itself by 0.00694 inches. To athermalize the lens set 32, the athermalization element 34 should have a focus shift of the same magnitude over the same temperature range, but in an opposite direction. Thus, the focus shift of the athermalization element 34 may be equal and opposite the focus shift of the lens set 32. Continuing the example, the focus shift of the athermalization element 34 may be $+6.94 \times 10^{-3}$ inch.

The focal length of the athermalization element 32, $f_d$, may be calculated from the following equation:

$$f_d = \frac{\Delta f_d}{X_d \cdot \Delta T}$$

$$f_d = \frac{+6.94 \times 10^{-3}}{X_d \cdot 40}$$

where: $\Delta f_d$ = focus shift of athermalization element 34

$x_d$ = optimum thermal expansion coefficient for athermalization element $\Delta T$ = temperature range As previously discussed, the focus shift and the temperature range are the same for the athermalization element 34 as for the lens set 32. The optimum thermal expansion coefficient for the athermalization element 34 may next be determined. The optimum thermal expansion coefficient of the athermalization element 34, $x_d$, may be calculated by the following equation:

$$x_d = 2\alpha_d + \frac{1}{n_o} \frac{dn_o}{dT}$$

where: $\alpha_d$ = thermal expansion of the athermalization element material $n_o$ = index of medium surrounding athermalization element i. e., air $\frac{dn_r}{dT}$ = change in index of medium surrounding athermalization element versus temperature Continuing the example and using polyethylene polymer, the optimum thermal expansion coefficient of the athermalization element 34 may be as follows:

$$x_d = 2(68 \times 10^{-6}) + \frac{1}{1} (-8.6 \times 10^{-7})$$

$$X_d = 1.35 \times 10^{-4}$$

Using $x_d = 1.35 \times 10^{-4}$, the focal length of the athermalization element 34 may be as follows:

$$f_d = \frac{6.48 \times 10^{-3}}{40(1.35 \times 10^{-4})}$$

$$f_d = 1.2 \text{ inches}$$

Accordingly, using TI 1173 glass for the lens set 32 and polyethylene polymer for the althermalization element 34, the athermalization element 34 may have a focal length of 1.2 inches for a 40° C. temperature range.

The diffractive pattern 42 of the athermalization element 34 may be formed on a second surface 44 of the infrared transmitting member 40. In one embodiment, the diffractive pattern 42 may be a series of concentric rings 46. The diffractive pattern 42 may be a kinoform surface, a binary surface, a phase plate or the like. It will be understood that the diffractive pattern 42 may be otherwise formed within the scope of the present invention.

A kinoform surface may be produced by diamond point turning, patterned and etched, or the like. Kinoforms are diffractive elements whose phase modulation is introduced by a surface relief pattern. The diffractive optical surface results in a step function whose surface is cut back by precisely one wavelength of the light frequency of interest, every time their thickness increases by that amount. The general equation for a diffractive surface is:

$$Z = \frac{(CC)*Y^2}{1+SQRT[1-(1+L)(CC)^2Y^2]} + AY^4 + BY^6 + CY^8 + DY^{10} + [HOR] * \left( \frac{C1Y^2 + C2Y^4 + C3Y^6}{(N1-N2)} - \frac{\lambda}{N1-N2)} * INT \frac{[C1Y^2 + C2Y^4 + C3Y^6]}{\lambda} \right)$$

where: Z is Sag value along the Z-axis or optical axis;

Y is the semi-diameter height;

CC is the base curvature (1/radius) of the surface;

K is the conic coefficient of surface;

A,B,C, and D are the 4th, 6th, 8th and 10th order aspheric coefficients, respectively;

HOR is the diffraction order, generally 1 or −1;

$\lambda$ is the design wavelength for surface;

N1 is the Refractive index of material preceding diffractive surface;

N2 is the Refractive index of material following diffractive surface; and

C1, C2, and C3 are coefficients for describing aspheric phase departure.

Further information concerning kinoform diffractive surfaces is disclosed by commonly assigned U.S. Pat. application Ser. No. 08/181,263, filed Jan. 13, 1994, and entitled "INFRARED CONTINUOUS ZOOM TELESCOPE USING DIFFRACTIVE OPTICS," which is hereby incorporated by reference.

In accordance with the invention, increasing temperatures may shorten the focal length of the lens set 32. In response to the temperature increase, the polymer of the infrared transmitting member 40 may expand to alter the diffractive pattern 42. The altered diffractive pattern 42 may lengthen a focal length of the athermalization element 34 to offset the shortening of the focal length of the lens set 32. Conversely, temperature decreases may lengthen the focal length of the lens set 32. In response to the temperature decrease, the polymer of the infrared transmitting member 40 may contract to alter the diffractive pattern 42. The altered diffractive pattern 42 may shorten the focal length of the athermalization element 34 to offset the lengthening of the focal length of the lens set 32.

The color correction element 35 may be positioned between the athermalization element 34 and the collection lens 38. The color correction element 35 may comprise a diffractive surface 48 formed on a first side 50. The diffractive surface 48 may correct axial and lateral color focusing aberrations. The diffractive surface 48 may be a kinoform produced by diamond point turning, pattern etch or the like.

Figure 3:
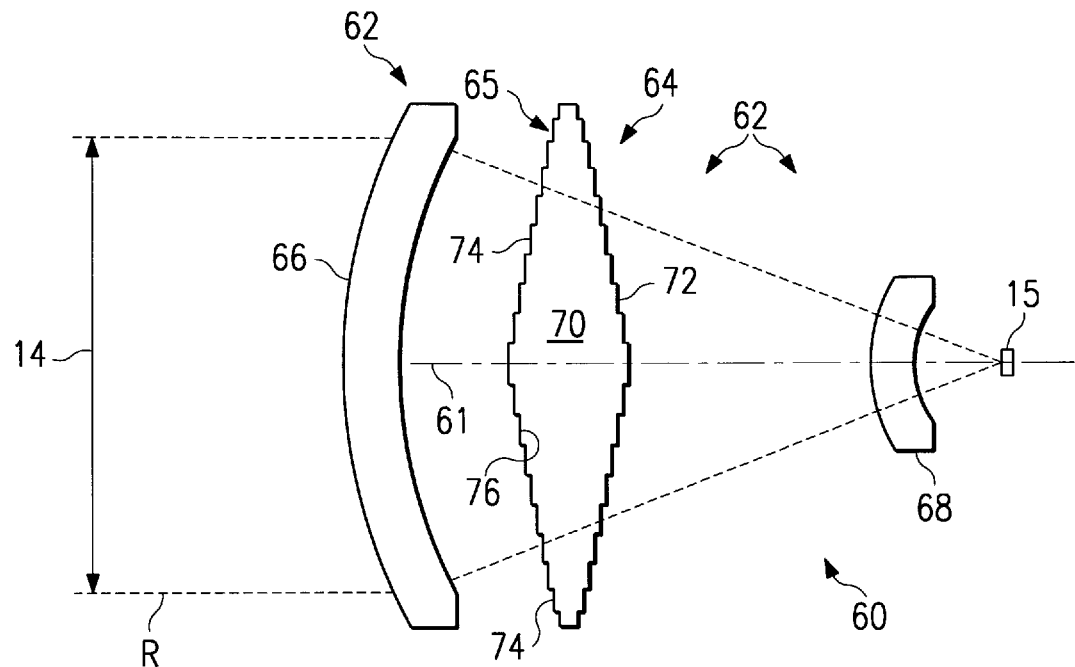
FIG. 3 is a schematic drawing illustrating another embodiment of the lens assembly of FIG. 1.

FIG. 3 is a schematic drawing of an infrared lens assembly 60 incorporating another embodiment of the present invention. In this embodiment, the lens assembly 60 may be positioned along an optic axis 61 to focus infrared radiation omitted by the object 14 onto the image plane 15 of the infrared detector 18. The lens assembly 60 may comprise a lens set 62 and an athermalization element 64. The lens set 62 may include one or more refractive lenses and a color correction element 65. The refractive lenses may include an objective lens 66 and a collection lens 68. The athermalization element 64 may include an infrared transmitting member 70 supporting a diffractive pattern 72. The color correction element 65 may include a diffractive surface 74.

For the embodiment of FIG. 3, the lens set 62 and the athermalization element 64 may be formed as previously described in connection with FIG. 2. The diffractive surface 74 of the color correction element 65 may be formed on a first side 76 of the infrared transmitting member 70. Accordingly, the diffractive surface 74 of the color correction element 65 may be opposite the diffractive pattern 72 of the athermalization element 64.

Figure 4:
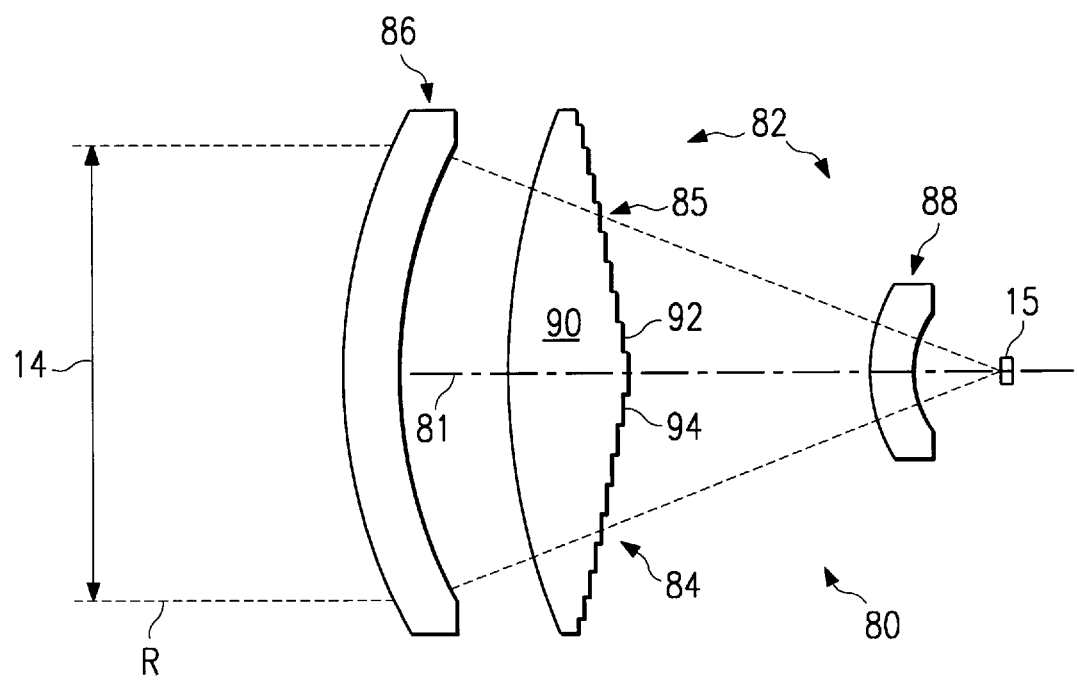
FIG. 4 is a schematic drawing illustrating yet another embodiment of the lens assembly of FIG. 1.

FIG. 4 is a schematic drawing of an infrared lens assembly 80 incorporating still another embodiment of the present invention. In this embodiment, the lens assembly 80 may be positioned along an optic axis 81 to focus infrared radiation omitted by the object 14 onto the image plane 15 of the infrared detector 18. The lens assembly 80 may comprise a lens set 82 and an athermalization element 84. The lens set 82 may include one or more refractive lenses and a color correction element 85. The refractive lenses may include an objective lens 86 and a collection lens 88. The athermalization element 84 may include an infrared transmitting member 90 supporting a diffractive pattern 92. The color correction element 85 may include a diffractive surface 94.

For the embodiment of FIG. 4, the lens set 82 and the athermalization element 84 may be formed as previously described in connection with FIG. 2. The diffractive pattern 92 of the athermalization element 84 may comprise the diffractive surface 94 of the color correction element 85. Accordingly, the diffractive pattern 92 may maintains infrared radiation of the scene 14 in focus at the image plane 15 and may also correct axial and lateral color focusing aberrations.

Although the present invention has been described with several embodiments, various changes and modifications may be suggested to one skilled in the art. It is intended that the present invention encompass such changes and modifications as fall within the scope of the appended claims.

What is claimed is:

1. An infrared lens assembly, comprising:

a lens set including one or more refractive lenses;

the lens set positioned along an optic axis to receive infrared radiation;

the lens set designed to focus infrared radiation of a scene at an image plane;

an athermalization element positioned along the optic axis in optical communication with the lens set;

the athermalization element comprising an infrared transmitting member supporting a diffractive pattern;

the infrared transmitting member comprising an infrared transmitting polymer; and the diffractive pattern configured to compensate for temperature induced changes in a focal length of the lens set to maintain infrared radiation of the scene in focus at the image plane.

2. The infrared lens assembly of claim 1, wherein the athermalization element is stationary along the optic axis.

3. The infrared lens assembly of claim 1, further comprising:

a focal length of the lens set shortening in response to a temperature increase;

the polymer of the infrared transmitting member expanding in response to the temperature increase to alter the diffractive pattern; and the altered diffractive pattern operable to lengthen a focal length of the athermalization element to offset the shortening of the focal length of the lens set.

4. The infrared lens assembly of claim 1, further comprising:

a focal length of the lens set lengthening in response to a temperature decrease;

the polymer of the infrared transmitting member contracting in response to the temperature decrease to alter the diffractive pattern; and the altered diffractive pattern operable to shorten a focal length of the athermalization element to offset the lengthening of the focal length of the lens set.

5. The infrared lens assembly of claim 1, further comprising the diffractive pattern formed on a surface of the infrared transmitting member.

6. The infrared lens assembly of claim 1, the diffractive pattern further comprising a series of concentric rings formed on a surface of the infrared transmitting member.

7. The infrared lens assembly of claim 1, the diffractive pattern further comprising a kinoform formed on a surface of the infrared transmitting member.

8. The infrared lens assembly of claim 1, the lens set further comprising:

a color correction element positioned along the optic axis in optical communication with the refractive lens and the athermalization element; and the color correction element comprising a diffractive surface to correct color aberrations of the refractive lens and the athermalization element.

9. The infrared lens assembly of claim 8, further comprising:

the diffractive pattern of the athermalization element formed on a surface of a side of the infrared transmitting member; and the diffractive surface of the color correction element formed on an opposite side of the infrared transmitting member.

10. The infrared lens assembly of claim 8, further comprising:

the diffractive pattern of the athermalization element formed on a surface of the infrared transmitting member; and the diffractive pattern comprising the diffractive surface of the color correction element.

11. An infrared imaging system, comprising:

an infrared detector including an image plane positioned along an optic axis;

a lens set comprising one or more refractive lenses;

the lens set positioned along the optic axis to receive infrared radiation;

the lens set designed to focus infrared radiation of a scene at the image plane;

an athermalization element positioned along the optic axis in optical communication with the lens set;

the athermalization element comprising an infrared transmitting member supporting a diffractive pattern;

the infrared transmitting member comprising an infrared transmitting polymer; and the diffractive pattern configured to compensate for temperature induced changes in a focal length of the lens set to maintain infrared radiation of the scene in focus at the image plane.

12. The infrared imaging system of claim 11, wherein the athermalization element is stationary along the optic axis.

13. The infrared imaging system of claim 11, further comprising:

a focal length of the lens set shortening in response to a temperature increase;

the polymer of the infrared transmitting member expanding in response to the temperature increase to alter the diffractive pattern; and the altered diffractive pattern operable to lengthen a focal length of the athermalization element to offset the shortening of the focal length of the lens set.

14. The infrared imaging system of claim 11, further comprising:

the focal length of the lens set lengthening in response to a temperature decrease; and the polymer of the infrared transmitting member contracting in response to the temperature decrease to alter the diffractive pattern; and the altered diffractive pattern operable to shorten a focal length of the athermalization element to offset the lengthening of the focal length of the lens set.

15. The infrared imaging system of claim 11, further comprising the diffractive pattern formed on a surface of the infrared transmitting member.

16. The infrared imaging system of claim 11, the diffractive pattern further comprising a series of concentric rings formed on a surface of the infrared transmitting member.

17. The infrared imaging system of claim 11, the diffractive pattern further comprising a kinoform formed on a surface of the infrared transmitting member.

18. The infrared imaging system of claim 11, the lens set further comprising:

a color correction element positioned along the optic axis in optical communication with the refractive lens and the athermalization element; and the color correction element comprising a diffractive surface to correct color aberrations of the refractive lens and the athermalization element.

19. The infrared imaging system of claim 18, further comprising:

the diffractive pattern of the athermalization element formed on a surface of a side of the infrared transmitting member; and the diffractive surface of the color correction element formed on an opposite side of the infrared transmitting member.

20. A method of athermalizing an infrared lens assembly, comprising the steps of:

transmitting infrared radiation of a scene through a lens set including one or more refractive lenses positioned along an optic axis;

transmitting infrared radiation of the scene through an infrared transmitting member positioned along the optic axis in optical communication with the refractive lens;

adjusting a polymer of the infrared transmitting member in response to a temperature change to alter a diffractive pattern of the infrared transmitting member to compensate for temperature induced changes in a focal length of the lens set to maintain infrared radiation of the scene in focus at an image plane.

* * * * *

UNITED STATES PATENT AND TRADEMARK OFFICE
CERTIFICATE OF CORRECTION

PATENT NO. : 5,808,799
DATED : September 15, 1998
INVENTOR(S) : Paul Klocek

It is certified that error appears in the above-indentified patent and that said Letters Patent is hereby corrected as shown below:

Column 1, line 4 insert --

NOTICE

Portions of this invention were made with support of the United States Government under contract No. DTRS 56-95-T-0001 awarded by the Defense Advanced Research Projects Agency (DARPA) and administrated by the Department of Transportation. The Government may have certain rights to the invention under the contract.--

Signed and Sealed this

Twenty-sixth Day of October, 1999

Attest:

Q. TODD DICKINSON

*Attesting Officer*  *Acting Commissioner of Patents and Trademarks*